(12) United States Patent
Wan et al.

(10) Patent No.: US 12,463,545 B2
(45) Date of Patent: Nov. 4, 2025

(54) ISOLATED BI-DIRECTIONAL DC CONVERSION CIRCUIT AND METHOD FOR CONTROLLING THE SAME

(71) Applicant: APTIV ELECTRIC SYSTEMS COMPANY LTD., Shanghai (CN)

(72) Inventors: Cheng Wan, Shanghai (CN); Lewei Qian, Shanghai (CN); Fei Chen, Shanghai (CN); Haibo Qiao, Shanghai (CN); Jianlei Yi, Shanghai (CN); Pengtao Zhao, Shanghai (CN)

(73) Assignee: APTIV ELECTRIC SYSTEMS COMPANY LTD., Shanghai (CN)

( * ) Notice: Subject to any disclaimer, the term of this patent is extended or adjusted under 35 U.S.C. 154(b) by 229 days.

(21) Appl. No.: 18/391,940

(22) Filed: Dec. 21, 2023

(65) Prior Publication Data
US 2024/0213884 A1    Jun. 27, 2024

(30) Foreign Application Priority Data
Dec. 21, 2022 (CN) .......................... 202211650796.6

(51) Int. Cl.
*H02M 3/335* (2006.01)
*H02M 1/00* (2006.01)

(52) U.S. Cl.
CPC ..... *H02M 3/33584* (2013.01); *H02M 1/0009* (2021.05); *H02M 1/0058* (2021.05); *H02M 3/33592* (2013.01)

(58) Field of Classification Search
CPC .... B60L 53/122; B60L 2210/30; H02P 11/04; H02P 2101/03; H02P 2101/45

USPC ......................................................... 323/205
See application file for complete search history.

(56) References Cited

U.S. PATENT DOCUMENTS

| | | | |
|---|---|---|---|
| 6,370,050 B1* | 4/2002 | Peng ................... | H02M 7/4807 363/17 |
| 6,560,127 B2* | 5/2003 | Wittenbreder, Jr. ........................ | H02M 3/33576 363/17 |
| 10,185,380 B1 | 1/2019 | Dreon et al. | |
| 10,635,150 B2 | 4/2020 | Elghrawi et al. | |
| 10,752,189 B2 | 8/2020 | Elghrawi et al. | |
| 11,342,705 B2 | 5/2022 | Elghrawi et al. | |
| 11,652,315 B2 | 5/2023 | Elghrawi et al. | |

(Continued)

*Primary Examiner* — Yemane Mehari
(74) *Attorney, Agent, or Firm* — Billion & Armitage

(57) ABSTRACT

An isolated bi-directional DC conversion circuit and a method for controlling the same are provided. The DC conversion circuit includes a transformer with a first energy storage element and a primary-side rectification bridge coupled to the primary side of the transformer and a second energy storage element and a secondary-side rectification bridge coupled to the secondary side of the transformer. The primary-side rectification bridge consists of multiple first power switching devices. The secondary-side rectification bridge consists of multiple second power switching devices. Each of the multiple first and the second power switching devices have a body diode in inverse parallel connection therewith. The DC conversion circuit further includes multiple first sampling resistors provided on each bridge arm of the secondary-side rectification bridge and a controller configured to perform switch control on the multiple second power switching devices based on a sampled voltage of the multiple first sampling resistors.

10 Claims, 11 Drawing Sheets

(56) References Cited

U.S. PATENT DOCUMENTS

| | | | |
|---|---|---|---|
| 12,166,424 B2* | 12/2024 | Hashimoto | H02M 3/33592 |
| 2020/0099309 A1* | 3/2020 | Jin | H02M 3/33592 |
| 2021/0297000 A1* | 9/2021 | Zocher | H02M 3/3376 |

* cited by examiner body diode rectification synchronous rectification

CLLC resonant circuit

CLLC resonant circuit

ISOLATED BI-DIRECTIONAL DC CONVERSION CIRCUIT AND METHOD FOR CONTROLLING THE SAME

CROSS-REFERENCE TO RELATED APPLICATION

This application claims benefit of priority to Chinese Patent Application No. 202211650796.6 filed on Dec. 21, 2022, the entire disclosure of which is hereby incorporated by reference.

TECHNICAL FIELD OF THE INVENTION

The disclosure relates to a technical field of electronics, and in particular to an isolated bi-directional DC conversion circuit and method for controlling the same.

BACKGROUND

With the development of electric vehicles, high-voltage battery is also advancing in the electric vehicles. Currently, the 400V battery packs adopted in the electric vehicles are gradually transformed to 800V packs. Batteries, electric drives, and chargers are core components related to the power of electric vehicles. The on-board charger (OBC) converts alternating current (AC) of, for example, 220V/50 Hz from the power grid into direct current (DC) as required under the battery voltage. As battery packs with 800V direct voltage are widely used in electric vehicles, OBCs are widely adapted to the voltage of 800V battery packs. For 400V battery packs, the variation range of battery voltage during operation is generally 300V-450V. For 800V battery packs, the variation range of battery voltage during operation is up to 680V-800V. Based on the increase of battery voltage, the charging power of OBC has also been increased from 6.6 KW at a battery voltage of 400V to 11 KW or even 22 KW at a battery voltage of 800V.

On the other hand, with the development of chargers and the increase of battery voltage, functions of the chargers are no longer limited to drawing power from the grid to charge the battery pack of electric vehicle. Meanwhile, outputting from the battery pack to supply power to an external power grid or electric equipment external to the vehicle has also become one of the functions of chargers. As an example, induction cooktops may be powered by the battery of electric vehicle for outdoor applications.

Bidirectional chargers have been developed to meet such applications. Bi-directional DC conversion circuit is the core of the bi-directional power conversion of a bi-directional charger, which is capable of both drawing power from the external and supplying it to the internal loads of the vehicle, as well as supplying power, for example, from the vehicle's batteries to external loads or to the power grid. The efficiency in both operating directions of the bi-directional DC conversion circuit becomes an important factor effecting the efficiency of OBC. However, traditional bi-directional DC converter circuit designs have not been able to strike a balance between stability, size, and cost, making it difficult to meet the higher requirements for safety, compactness, and cost of electric vehicles.

SUMMARY

In some aspects, the techniques described herein relate to an isolated bi-directional DC conversion circuit, including: a transformer with at least one first energy storage element; a primary-side rectification bridge coupled to a primary side of the transformer and with at least one second energy storage element: a secondary-side rectification bridge coupled to a secondary side of the transformer, wherein the primary-side rectification bridge consists of multiple first power switching devices, wherein the secondary-side rectification bridge consists of multiple second power switching devices, and wherein each of the multiple first power switching devices and the second power switching devices having a body diode in inverse parallel connection therewith: multiple first sampling resistors respectively provided on each bridge arm of an upper bridge arm or a lower bridge arm of the secondary-side rectification bridge: and a controller configured to, in a first mode for power conversion from the primary side to the secondary side, perform switch control on the multiple second power switching devices based on a sampled voltage of the multiple first sampling resistors.

In some aspects, the techniques described herein relate to a method for controlling an isolated bi-directional DC conversion circuit, the method including: acquiring a sampled voltage of multiple first sampling resistors provided on an upper bridge arm or a lower bridge arm of a secondary-side rectification bridge of the isolated bi-directional DC conversion circuit: and in a first mode for power conversion from a primary side to a secondary side, performing switch control on multiple second power switching devices based on a sampled voltage of the multiple first sampling resistors.

BRIEF DESCRIPTION OF THE DRAWINGS

The present invention is now described, by way of example with reference to the accompanying drawings, in which:

FIG. 5 illustrates a case in which a primary side switching frequency of the DC-DC converter is greater than the resonant frequency according to an embodiment.

FIG. 6 illustrates a case in which the primary side switching frequency is equal to the resonant frequency according to an embodiment.

DETAILED DESCRIPTION

Figure 1:
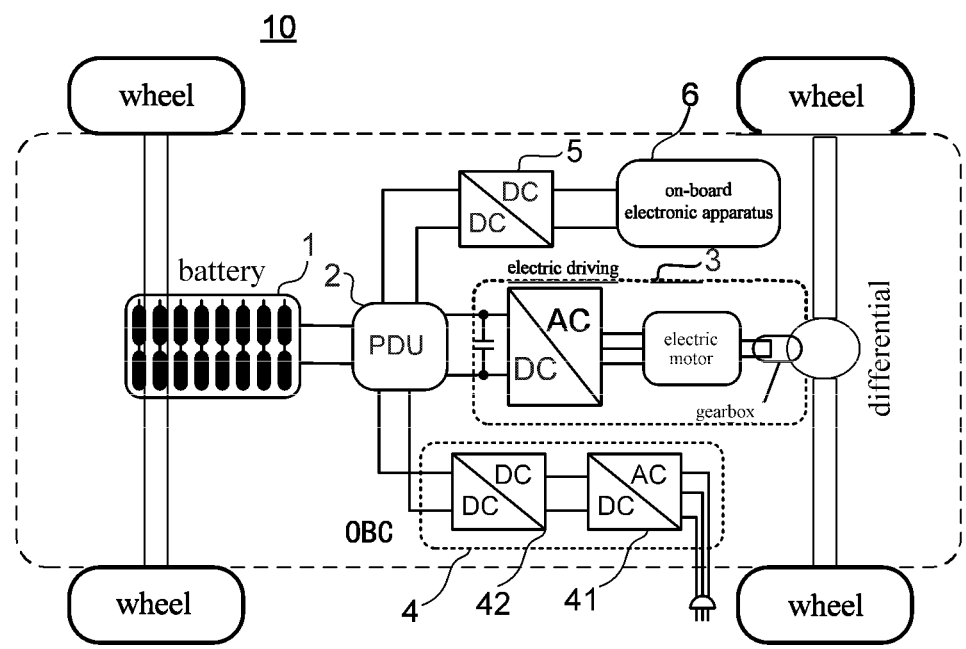
FIG. 1 shows an architectural diagram of an example energy system of an electric vehicle according to an embodiment.

In the following description, numerous specific details are set forth. However, it is to be understood that embodiments of the invention may be practiced without these specific details. In other instances, well-known circuits, structures, and technologies have not been shown in detail to avoid obscuring the understanding of the description.

References to "one embodiment." "an embodiment." "an example embodiment," etc., indicate that the embodiment described may include a particular feature, structure, or characteristic, but each embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiment whether or not explicitly described.

For the purposes of the present disclosure, the phrase "A and/or B" is intended to mean either (A), (B), or (A and B). For the purposes of the present disclosure, the phrase "A, B and/or C" is intended to mean either (A), (B), (C), (A and B), (A and C), (B and C), or (A, B. and C).

In the following description and claims, the terms "coupled" and "connected." along with their derivatives, may be used. It is to be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet co-operate or interact with each other.

Electric vehicles place higher demands on vehicle energy systems, one aspect of which is reflected in the increase in power as well as the increase in usage. On-board charger (OBC) is an important part of vehicle energy systems, which mainly comprises an AC-DC converter and a DC-DC converter. The AC-DC converter acting as a pre-stage to the DC-DC converter, converts the AC power with, for example, 220V/50 Hz (as an example, from the grid or from a charging pile) to DC power with a fixed voltage. 500V for example. The DC-DC converter converts the converted DC power from the AC-DC converter into a required DC power with a required voltage and provides it to the energy system for distribution. The DC-DC converter enables a variable output voltage to cope with different loads. Demands for the variable output voltage may arise from different loads. Depending on different ambient temperatures, age, etc., even for a same load, demands for output voltage may also vary.

Energy systems with a bi-directional charging and discharging function have been developed as the capacity of on-board batteries has increased. In such application, P external power may charge the on-board battery via the OBC, and the on-board battery may also output its own stored power to external electric devices via the OBC. In the latter case, the DC-DC converter becomes a pre-stage DC-DC power conversion module relative to the AC-DC converter.

FIG. 1 shows an architectural diagram of an example energy system 10 of an electric vehicle. The example energy system 10 comprises a battery 1, a power distribution unit (PDU) 2, an electric driving unit 3, an OBC 4, and an on-board electronic apparatus 6.

OBC 4 may draw AC power from the power grid or AC charging pile. OBC 4 converts the drawn AC power into DC power and provides the DC power to PDU 2 or to battery 1 via PDU 2.

PDU 2 performs power management in order to, for example (1) supply the converted DC power by OBC 4 to battery 1 for charging: (2) distribute the power from battery 1 to electric driving unit 3, and/or supply the power, after being boosted or bucked (e.g., 12V, 18V, 24V, etc.) by the DC-DC converter unit 5, to on-board electronic apparatus 6: and (3) supply the power obtained by the electric driving unit 3 through kinetic energy recovery to battery 1 for charging. PDU 2 also provides protection against overload short-circuit, high voltage sampling, and low voltage control, to protect and monitor the operation of energy system 10.

As is described above, OBC 4 may comprise an AC-DC converter 41 and a DC-DC converter 42. The AC-DC converter 41 performs Power Factor Correction (PFC) on the input AC power and converts the AC power to DC power with a constant voltage. The DC-DC converter 42 performs a further conversion on the AC power from the AC-DC converter 41 to achieve DC power output that has voltage as required by the load (for example, the battery 1).

In one implementation, the AC-DC converter 41 may be a Power Factor Correction (PFC) circuit. The DC-DC converter 42 may be an LLC resonant circuit or a CLLC resonant circuit. In some embodiments, the pre-stage to the rectifier 41 can further be provided with an Electromagnetic Interference (EMI) filter.

In the case where the DC-DC converter 42 is an LLC resonant circuit, the OBC 4 is operating in a unidirectional manner. In the unidirectional manner, upon the AC power being converted into DC power via the PFC 41, the LLC resonant circuit will convert the converted DC power into DC power with required voltage. In the case where the LLC resonant circuit is adopted, the OBC 4 can only draw power from the external, while cannot output power to the external.

In the case where the DC-DC converter 42 is a CLLC resonant circuit, since the CLLC resonant circuit is capable of performing bi-directional DC conversion, the OBC 4 is capable of operating in a bi-directional manner, i.e., in both charging direction (hereinafter sometimes referred to as the "a first mode") and discharging direction (hereinafter sometimes referred to as the "a second mode"). In the first mode, the AC power is converted, via the PFC, into DC power with a constant voltage, and then the DC power is converted by the CLLC resonant circuit into DC power with a required voltage, and such DC power with a required voltage is provided to PDU 2 or other loads. In the second mode, the OBC 4 serves as an inverter. In this way, the DC power from battery 1 is boosted by the CLLC resonant circuit and then converted to an AC power by the PFC to be supplied to the external load.

Figure 2:
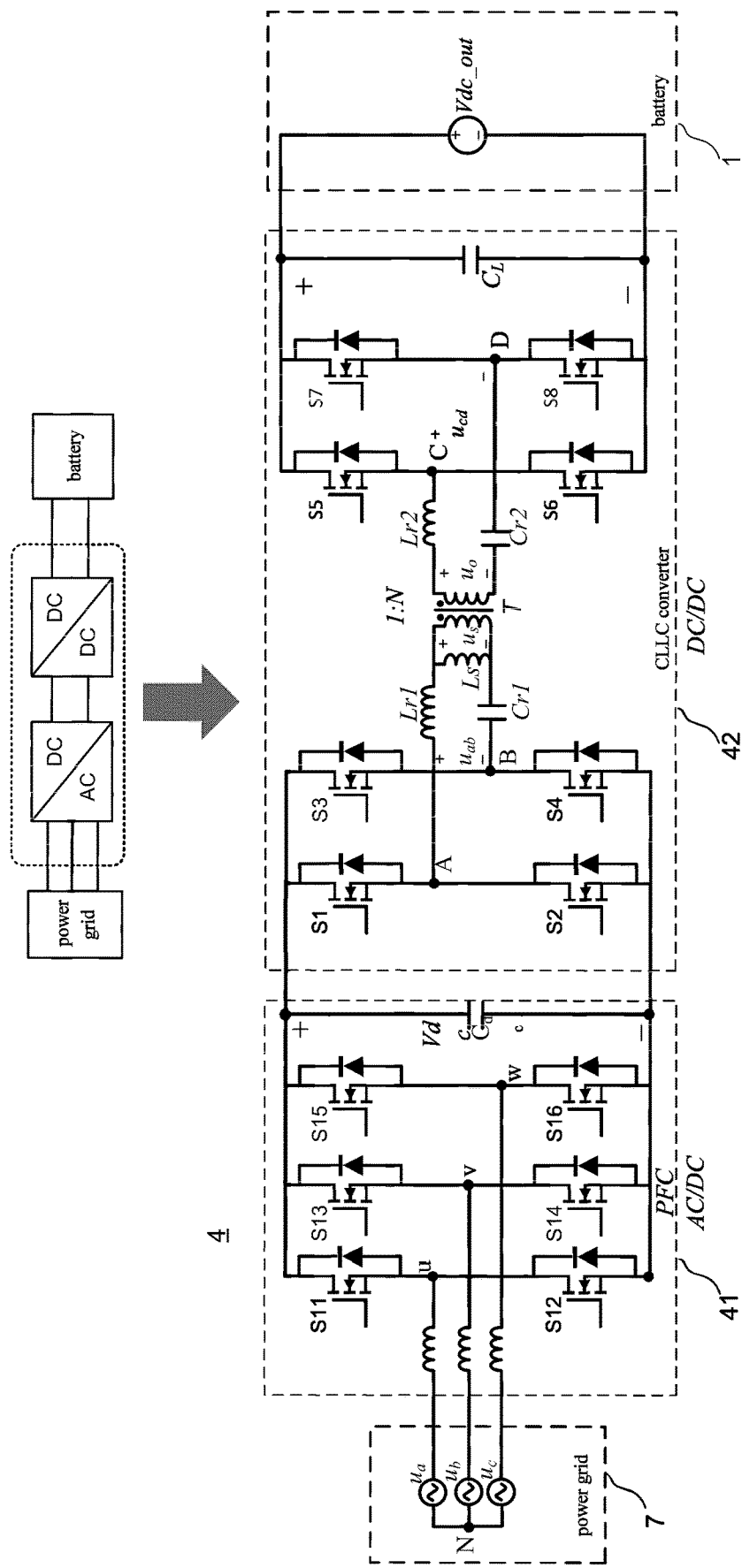
FIG. 2 shows an example topology of an on-board charger according to an embodiment.

FIG. 2 shows an example topology of the OBC 4. In the implementation shown in FIG. 2, the AC-DC converter 41 takes advantages of a three-phase half-bridge PFC to cope with high power and bi-directional operation applications. The AC-DC converter 41 comprises a half-bridge rectifier circuit comprising power switching devices S11, S13, S15 on the upper bridge arm and power switching devices S12, S14, S16 on the lower bridge arm. The midpoints of power switching devices S11 and S12 are connected to the u-phase, the midpoints of power switching devices S13 and S14 are connected to the v-phase, and the midpoints of power switching devices S15 and S16 are connected to the w-phase, thereby forming a three-phase interleaved connection. Each power switching device S11-S16 has a body diode connected in reverse parallel therewith at both ends of the power switching device. The power switching devices S11-S16 may be a Metal-Oxide-Semiconductor Field-Effect Transistor (MOSFET) for example. Switching control for each power switching device S11-S16 is realized by providing a control signal to respective gates of the power switching devices S11-S16. Other types of bi-directional PFC, such as two-phase interleaved PFC, four-phase interleaved PFC, etc., may also be adopted to implement the AC-DC converter 41, and the AC-DC converter 41 shown in FIG. 2 is merely an example.

The DC-DC converter 42 takes advantages of a CLLC resonant circuit, which comprises eight power switching devices S1-S8, two high-frequency inductors Lr1, Lr2, two high-frequency capacitors Cr1, Cr2, and a high-frequency transformer T. Similar with the power switching devices S11-S16, the power switching devices S1-S8 may also be MOSFET. The inductor Lr1 along with the capacitor Cr1 (being equivalent to "a first power storage element") is provided on the primary side of the transformer T, and the inductor Lr2 along with the capacitor Cr2 (being equivalent to "a second power storage element") is provided on the secondary side of the transformer T. The CLLC resonant circuit acts as an LLC resonant circuit in the direction from the primary side to the secondary side (the first mode), and acts as a booster circuit in the direction from the secondary side to the primary side (the second mode). The inductor Lr2 and capacitor Cr2 enable the CLLC resonant circuit to have a good gain even when acting as a booster circuit (the second mode). The primary side of the transformer T also comprises an H-bridge consisting of the power switching devices S1-S4, and secondary side comprises an H-bridge consisting of the power switching devices S5-S8. The output of DC-DC converter 42 may be connected to the above-mentioned PDU 2 or battery 1, etc.

The power switching devices S5-S8 on the secondary side enable the DC-DC converter 42 to operate in the second mode. The inductor Lr2 and capacitor Cr2 enable the DC-DC converter 42 to achieve an ideal gain when operating in the second mode.

With the improvement of the battery capacity as well as the power of OBC 4, losses in OBC 4 has become a pressing issue. Losses in the power conversion circuit are mainly originated from primary/secondary side conduction losses, primary/secondary side switching losses, magnetic losses, and copper losses. Increase in losses results in energy wasting, heat generation, and other problems. For the LLC resonant circuit and CLLC resonant circuit, conduction losses due to the body diode on the secondary side dominate. This is because the body diode itself has a certain voltage drop, for example of 0.3V-0.9V, due to characteristics of PN junction. With a load current of 10 A, a single body diode will have a conduction loss up to 3-9 W. With a Low voltage high current of 40 A for example, a single body diode will have a conduction loss up to 12-36 W.

Synchronous rectification can be applied to CLLC circuits with power switching devices S5-S8 on the secondary side to suppress the high conduction losses of body diodes. Synchronous rectification generally takes advantage of the low conduction losses of active conduction devices, such as power switching devices, to eliminate the original high losses of diodes in this application scenario. In other words, when the diode on some bridge arm is switched on, synchronous rectification switches on the active conduction device in parallel with that diode. Due to the low on-resistance of the active conduction device, the resulting voltage drop is much lower than that of a diode and is therefore equivalent to short-circuiting the diode connected in parallel with it, which reduces the conduction losses of the circuit.

Figure 3A:
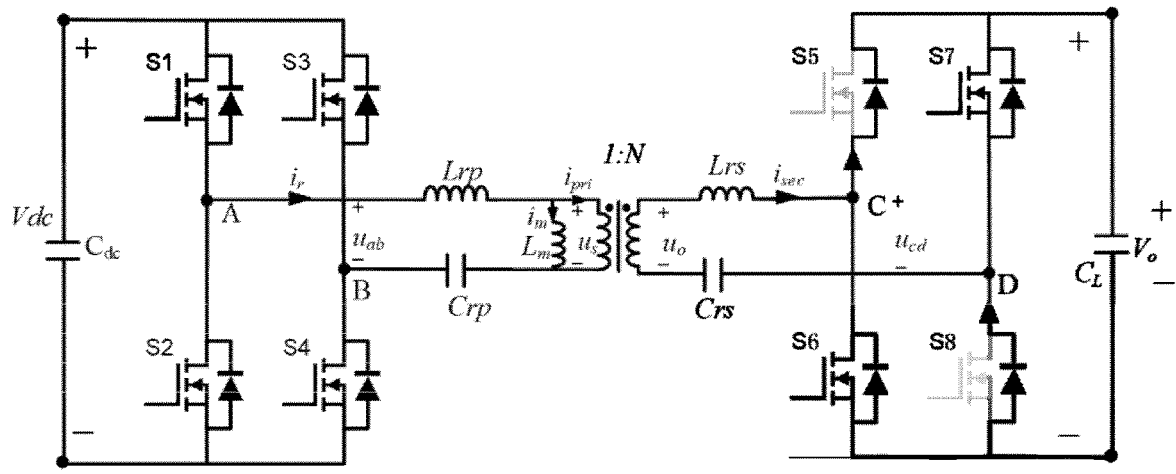
FIG. 3A shows a schematic diagram of body diode rectification using active conduction devices according to an embodiment.

FIG. 3A illustrates body diode rectification without synchronous rectification. As is shown, in the case where the power switching devices S1 and S4 on the primary side are switched on, a secondary side current along the direction shown by the arrow is induced on the secondary side, and the current flows through the body diode of the power switching device S5, the capacitor $C_L$, the body diode of the power switching device S8, the capacitor Crs, the secondary-side winding of the transformer T, and the inductors Lrs to form a loop (the bypassed power switching devices S5, S8 are indicated in the figure in a low gray scale). In this case, since the power switching devices S5 and S8 are switched off, the current can only flow through the corresponding body diodes, resulting in the conduction loss of the body diodes.

Figure 3B:
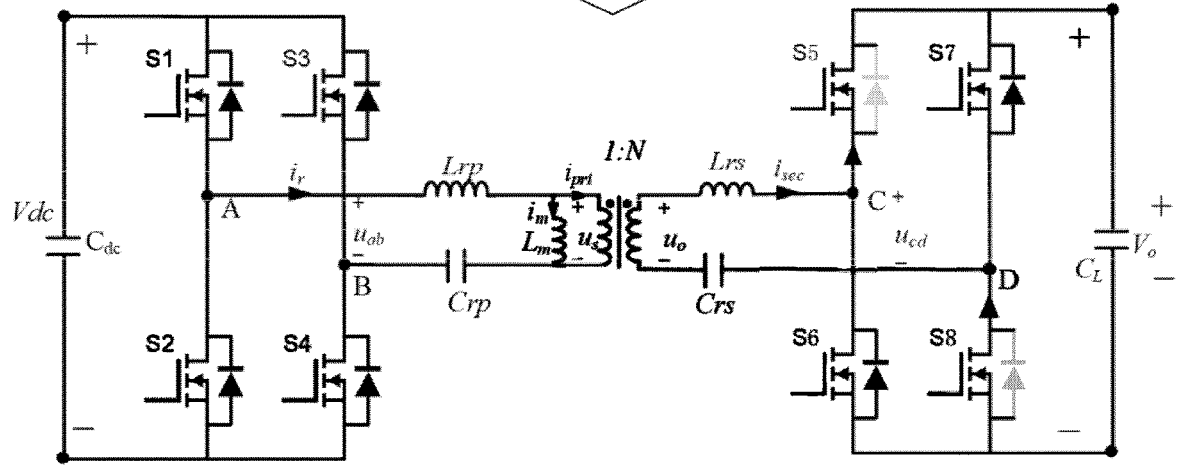
FIG. 3B shows a schematic diagram of synchronous rectification using active conduction devices according to an embodiment.

In the case where synchronous rectification is adopted, as is shown in FIG. 3B, the power switching devices S5 and S8 are switched on. In this case, as is shown by the arrow; the secondary side current flows through the power switching device S5, the capacitor $C_L$, the power switching device S8, the capacitor Crs, the secondary-side winding of the transformer T, and the inductors Lrs to form a loop. The on resistance of power switching devices S5 and S8 is very low, which makes the body diodes connected in inverse parallel therewith being bypassed. In other words, the secondary side current flows through the power switching devices S5 and S8, rather than the body diodes in parallel connection with them (the short-circuited body diodes are indicated in the figure in a low gray scale). Thus, the high conduction loss of the body diodes is replaced with the low conduction loss of the power switching devices. During the other half cycle when the primary-side power switching devices S2, S3 are switched on, the power switching devices S6, S7 on the secondary side can be synchronously rectified for the other half cycle.

The power switching devices S5-S8 on the secondary side need to be switched on and off within an appropriate period of time t0 enable the synchronous rectification. In particular, the power switching devices connected in parallel need to be switched on during the period when the current flows through the body diode and be switched off during other periods. If the power switching devices are switched on at an inappropriate time, current may flow through all four bridge arms of the secondary-side circuit at the same time, creating stability (short circuit) problems or even damaging the circuit.

Since the secondary-side rectification bridge rectifies the induced power originated from the primary side power, depending on the state of operation of the circuit as well as the resonance parameters, the switching timing of the power switching devices S5-S8 on the secondary side may be different from that of the power switching devices S1-S4 on the primary side.

Figure 4:
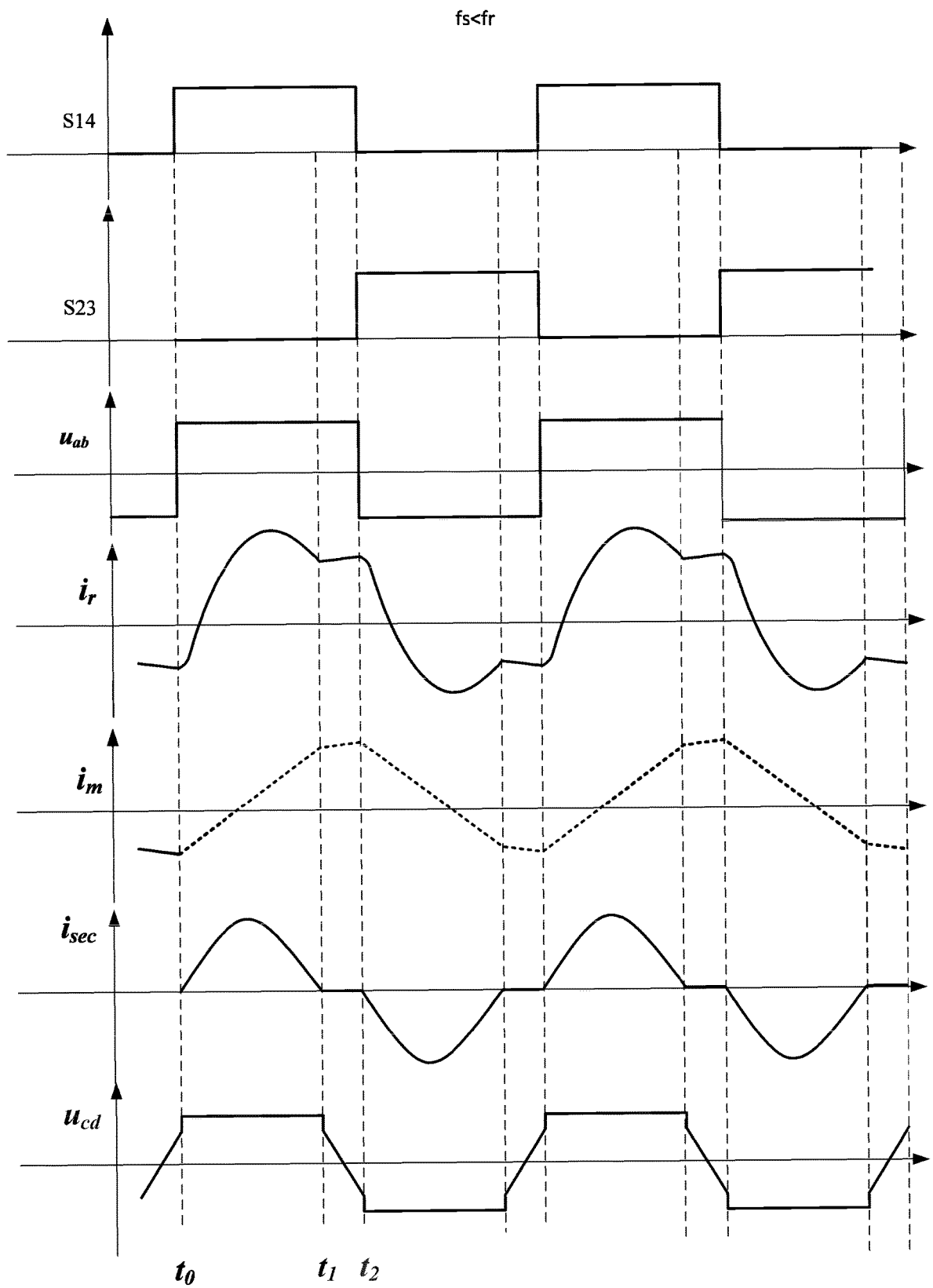
FIGS. 4-6 illustrate the timing waveforms of the DC-DC converter shown in FIG. 2 at different switching frequencies according to an embodiment.
Figure 5:
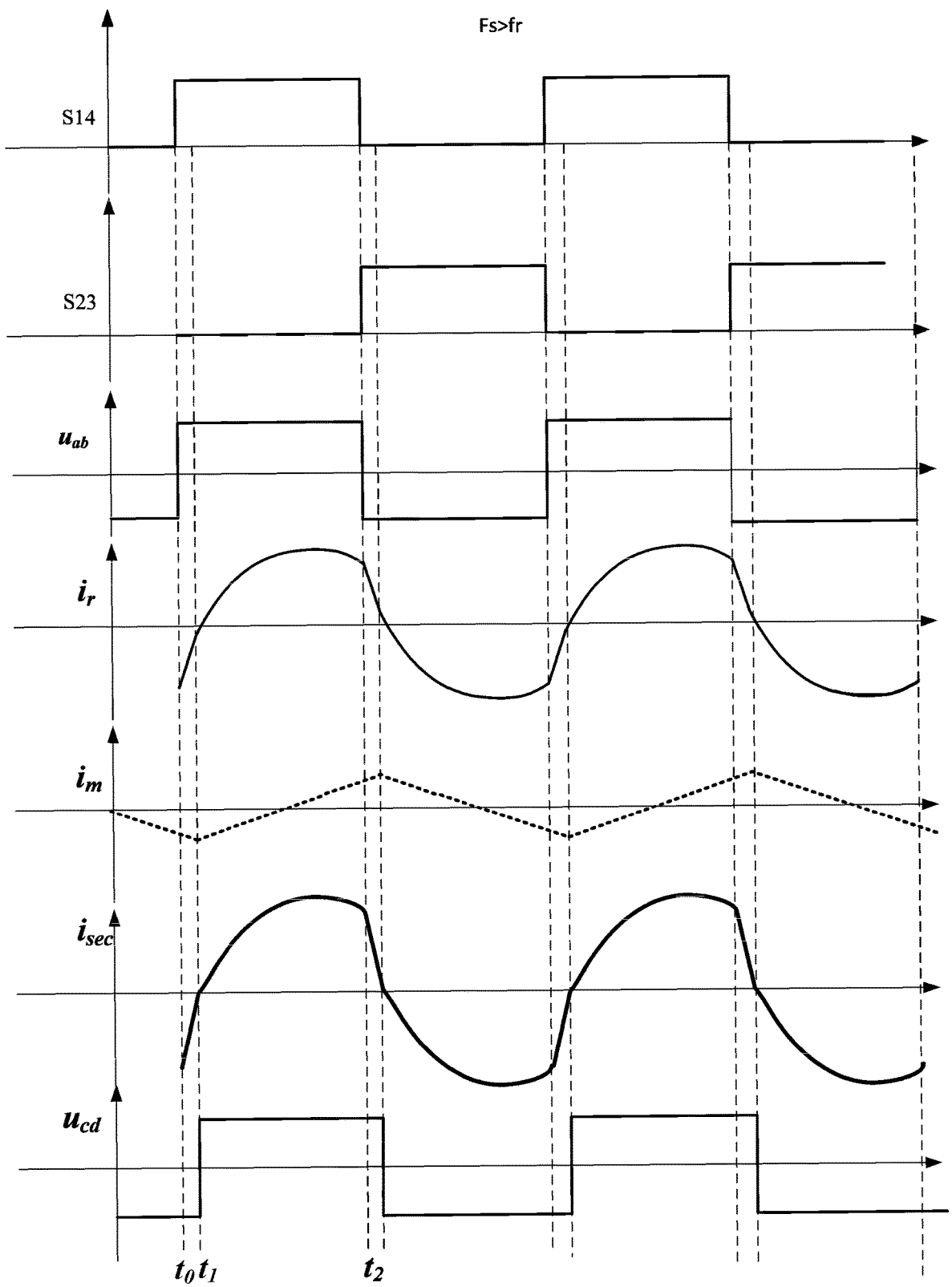
Figure 6:
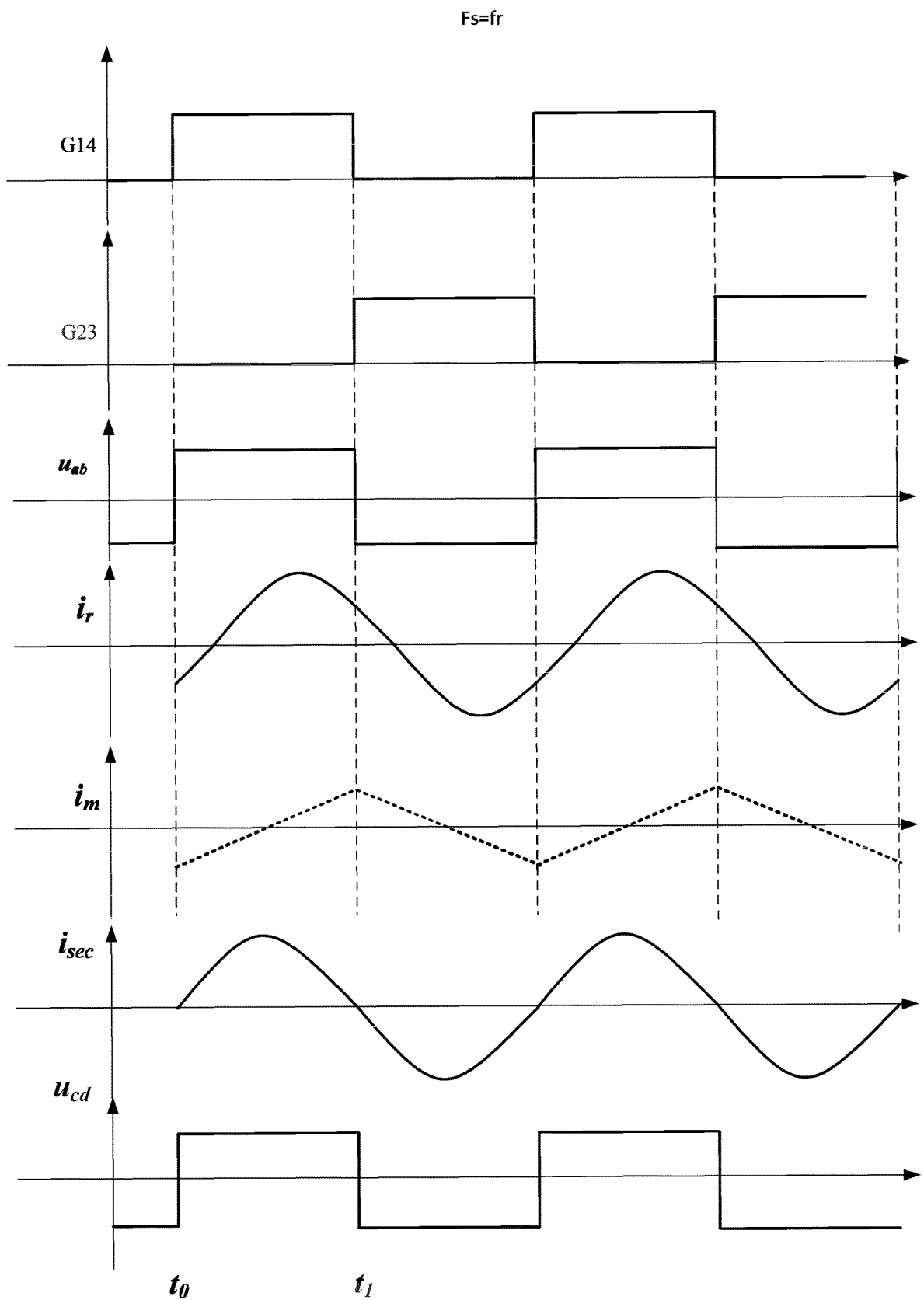

FIGS. 4-6 illustrate the timing waveforms of the DC-DC converter 42 shown in FIG. 2 at different switching frequencies, wherein FIG. 4 illustrates a case where the primary side switching frequency fs is less than the resonant frequency fr, FIG. 5 illustrates a case where the primary side switching frequency fs is greater than the resonant frequency fr, and FIG. 6 illustrates a case where the primary side switching frequency fs is equal to the resonant frequency fr. The resonant frequency fr depends on the parameters of the energy storage elements, i.e., capacitors and inductors, of the resonant circuit.

When the primary side switching frequency fs is less than the resonant frequency fr, at time to, a secondary side voltage is generated synchronously with the power switching devices S1, S4 on the primary side being switched on, as shown in FIGS. 4 and 6. However, when the primary side switching frequency fs is greater than the resonant frequency fr, the generation of secondary side voltage $u_{cd}$ lags. That is, at time t0, the power switching devices S1, S4 on the primary side are switched on (rising edge). The secondary side voltage $u_{cd}$ is not generated immediately at time t0 but is delayed until t1 thereafter. In this case, in order to enable the synchronous rectification, the time at which the power switching devices S5-S8 on the secondary side are switched on shall be later than the time at which the power switching devices S1-S4 on the primary side are switched on. As a result, it is not feasible to control the power switching devices S5-S8 on the secondary side directly based on the control timing for the power switching devices S1-S4 on the primary side.

Figure 7A:
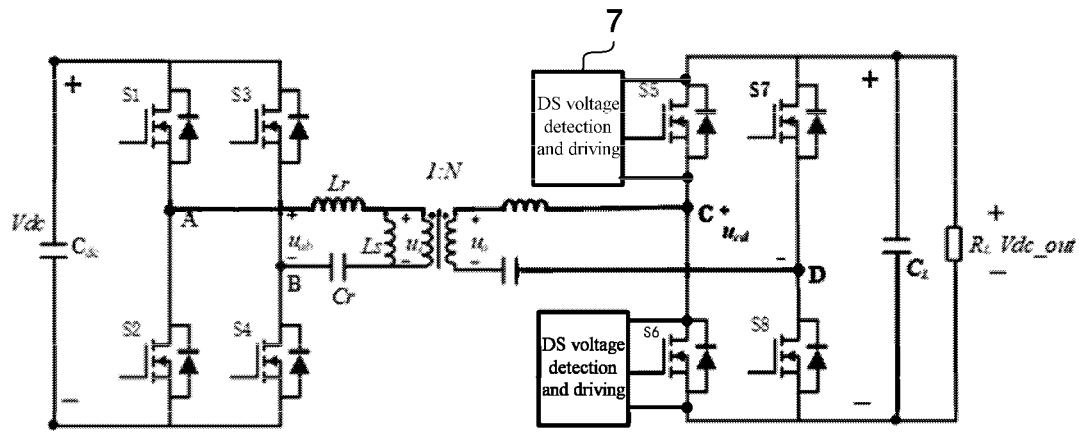
FIG. 7A shows a synchronous rectification control scheme based on the voltage detection for the secondary-side power switching devices according to an embodiment.
Figure 7B:
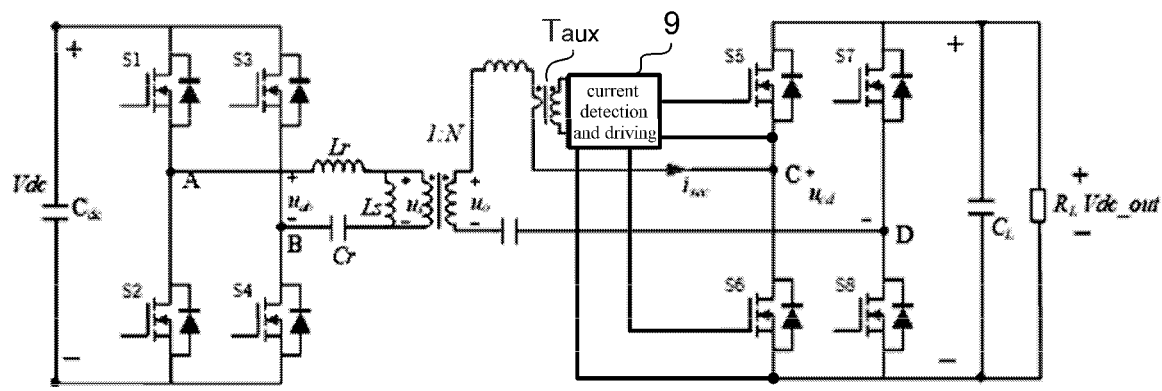
FIG. 7B shows a synchronous rectification control scheme based on the detection of secondary-side current according to an embodiment.

It is complex to control the secondary-side power switching devices S5-S8 by considering the control timing of the primary-side power switching devices S1 to S4 and the switching frequency, and the control accuracy depends on the calculation of the secondary side delay. There are two approaches proposed for accurately controlling the switching-on/off of the secondary-side power switching devices S5-S8 to enable the synchronous rectification. FIG. 7(A) shows a synchronous rectification control scheme based on voltage detection of the secondary-side power switching devices. FIG. 7(B) shows a synchronous rectification control scheme based on the detection of secondary side current.

As is shown in FIG. 7(A), in the synchronous rectification control scheme based on voltage detection for the secondary-side power switching devices, voltage detection is performed for each of secondary-side power switching devices S5-S8. The principle is that when a current flows through the body diode, the voltage across a corresponding power switching device is significantly reduced, and the corresponding power switching device can be switched on based on such a voltage reduction. On the basis of the CLLC resonant circuit shown in FIG. 2, a DS voltage detection function is added to the driving module for the secondary-side power switching devices S5-S8 in the example shown in FIG. 7(A). The DS voltage detection and driving module 7 is used to detect an on-state voltage Vds between the source and the drain of a corresponding power switching device and provide a control signal to the gate of the corresponding power switching device. When the DS voltage detection and driving module 7 detects a decrease in the on-state voltage Vds of the corresponding power switching device, it may output a high level to the gate thereof to enable the power switching device. In FIG. 7(A), only the DS voltage detection and driving module 7 corresponding to the power switching devices S5 and S6 are shown for ease of illustration, but the on-state voltage of each power switching devices S5-S8 is captured independently by separate DS voltage detection and driving module 7 and each power switching devices S5-S8 is independently by the separate DS voltage detection and driving module 7.

However, the problem with this voltage detection scheme is that the voltage across the terminals of the power switching device can only be used to determine the on-time of the power switching device, and not the off-time of the power switching device, because the voltage across the terminals of the power switching device does not increase until the power switching device is switched off. Therefore, the off time of the power switching device must be determined based on the conducting of body diodes on neighboring bridge arms.

By way of example, when a current flows in the body diode connected in inverse parallel with the power switching device S5, the power switching device S5 may be switched on in response to the detection of a decrease in voltage across the power switching device S5. Similarly, the power switching device S8 is switched on in response to the detection of a decrease in voltage across the power switching device S8. When the secondary side circuit enters the other half of the cycle, i.e., when current is generated in the circuit where the power switching devices S7, S6 are located, current flows in the body diode connected in inverse parallel with the power switching devices S6, S7. Based on the same principle, the power switching devices S6 and S7 are switched on in response to a decrease in the voltage across their terminals. At this time, the power switching devices S5, S8 on respective neighboring bridge arms need to be switched off. However, when current switching is performed, voltages across the power switching devices S5, S8 that have originally been switched on do not increase, and it is not possible to actively switch off the power switching devices S5, S8 based on voltages across the power switching devices S5, S8, but only on the switching-on of power switching devices S6, S7, and the power switching devices S5, S8 may be switched off based on the principle of complementary control. As a result, there will be a brief period of simultaneous conduction of power switching devices S5 to S8 during the current switching. Since the power switching devices S5-S8 do not possess the characteristic of unidirectional turn-off, this can result in serious stability problems or even damage to the circuit. Thus, the scheme based on voltage detection requires additional control circuit to prevent this simultaneous conduction of power switching devices S5-S8.

On the other hand, with the increase in power of DC-DC converter 42, the EMI effect of the main circuit of the DC-DC converter 42 on the DS voltage detection and drive circuit 7 significantly increases because the DS voltage detection and drive circuit 7 is often provided on the same circuit board as the main circuit. The EMI effect of the main circuit may result in incorrect control for the power switching devices S5-S8 by the DS voltage detection and drive circuit 7.

In the scheme based on current detection shown in FIG. 7(B), the on/off timing of individual power switching devices S5-S8 can be determined by detecting the direction of the secondary side current. However, since the secondary side current tends to be high, e.g., sometimes up to tens of amperes, an auxiliary transformer Taux is required to be provided on the basis of the CLLC resonant circuit shown in FIG. 2, to obtain a reduced current to enable a detection for the direction by the current detection and driving module 9. The respective gates of power switching devices S5-S8 are controlled by the current detection and driving module 9. The current detection and driving module 9 controls the on/off timing of the power switching devices S5-S8 for synchronous rectification by detecting the direction of current sensed by the auxiliary transformer Taux. However, this control scheme requires installing an additional auxiliary transformer, Taux, which results in a larger device size as well as higher costs.

Figure 8A:
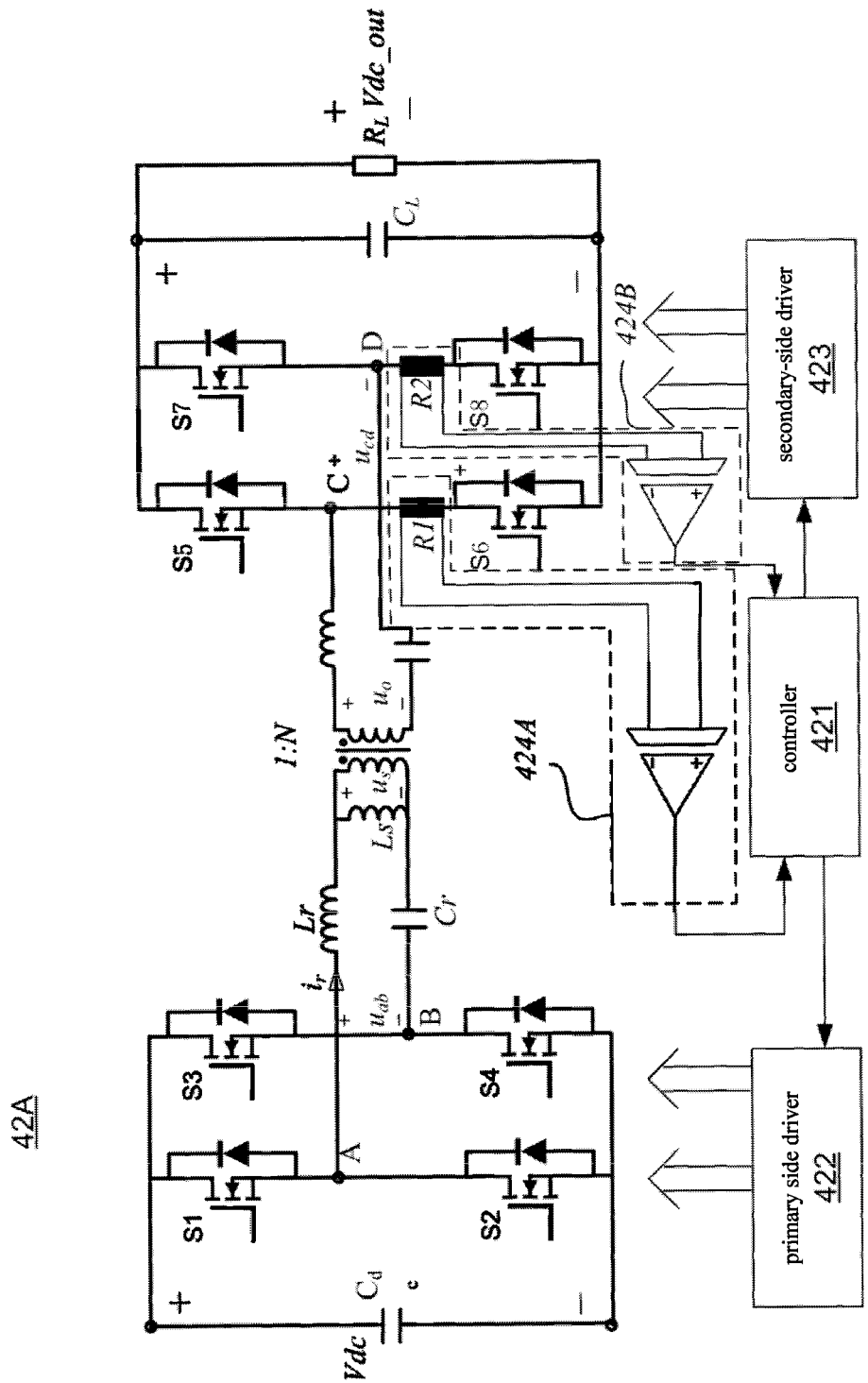
FIGS. 8A and 8B show schematic diagrams of synchronous rectification control schemes according to the techniques of the disclosure according to an embodiment.
Figure 8B:
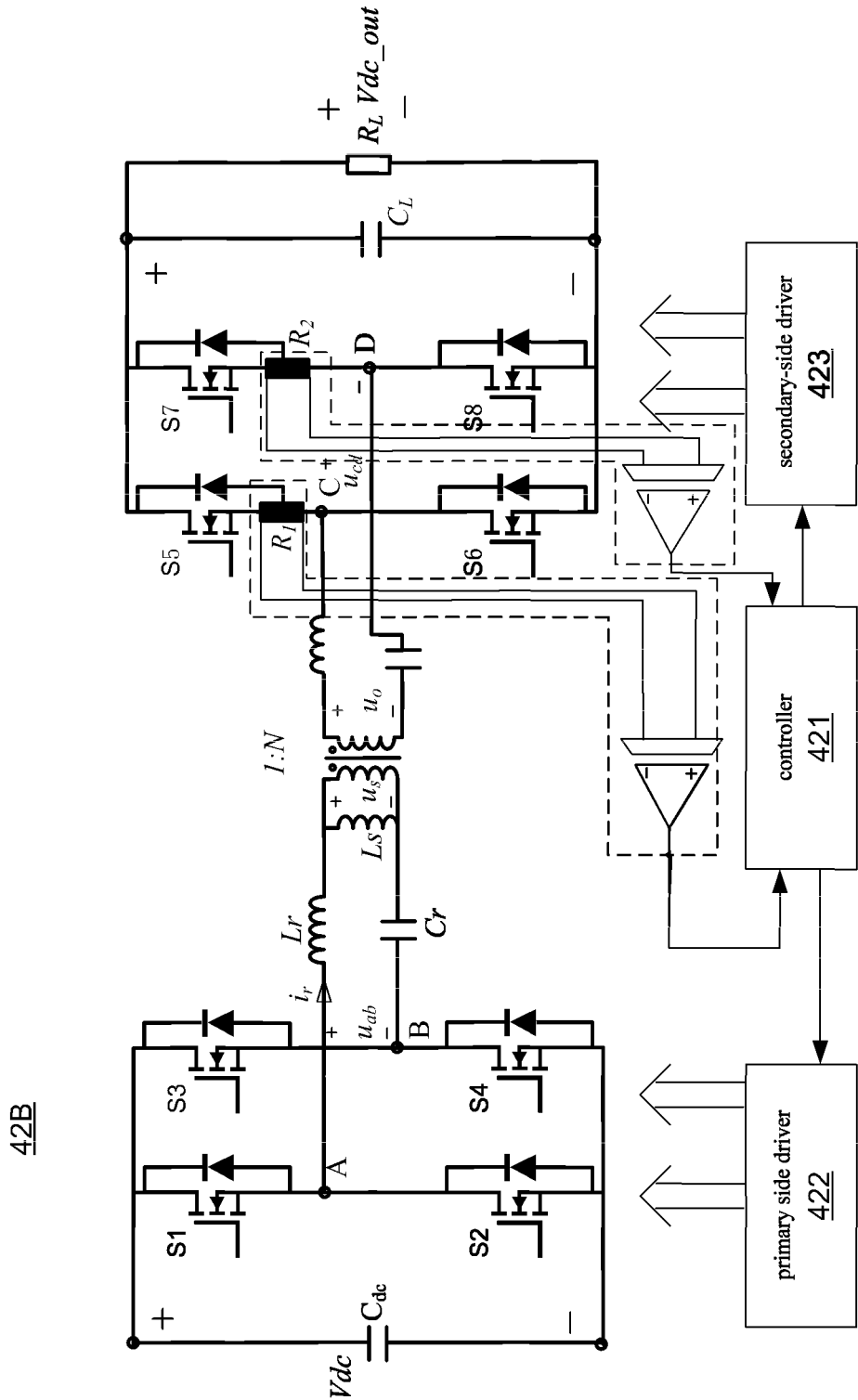

FIGS. 8(A) and 8(B) show schematic diagrams of synchronous rectification control schemes according to the techniques of the disclosure. The DC-DC converter 42A shown in FIG. 8(A) and FIG. 8(B) is still exemplified by the CLLC resonant circuit shown in FIG. 2. In an example implementation, although not shown in FIG. 2, the DC-DC converter 42A includes a controller 421, a primary-side driver 422, and a secondary-side driver 423. The controller 421 is used to provide control instructions such as Pulse Width Modulation (PWM) signals to the primary-side driver 422 and the secondary-side driver 423, to control the on/off of the primary-side power switching devices S1-S4 and the secondary-side power switching devices S5-S8, respectively, so as to make the entire circuit provide a desired output and operate in an optimal mode of operation.

In the embodiment, on this basis, Shunt resistors (also referred to herein as first sampling resistors) R1, R2 are added on the secondary side. The sampling resistors R1, R2 are provided on each bridge arm of an upper bridge arm or a lower bridge arm of the secondary-side rectifier bridge, respectively, and a case where the sampling resistors R1, R2 are provided in each of the lower bridge arms, respectively, is illustrated in FIG. 8(A), and a case in which the sampling resistors R1, R2 are provided on each of the upper bridge arms, respectively, is illustrated in FIG. 8(B). The sampling resistors R1, R2 are coupled to the controller 421 via the sampling circuits 424A, 424B, respectively.

Figure 9:
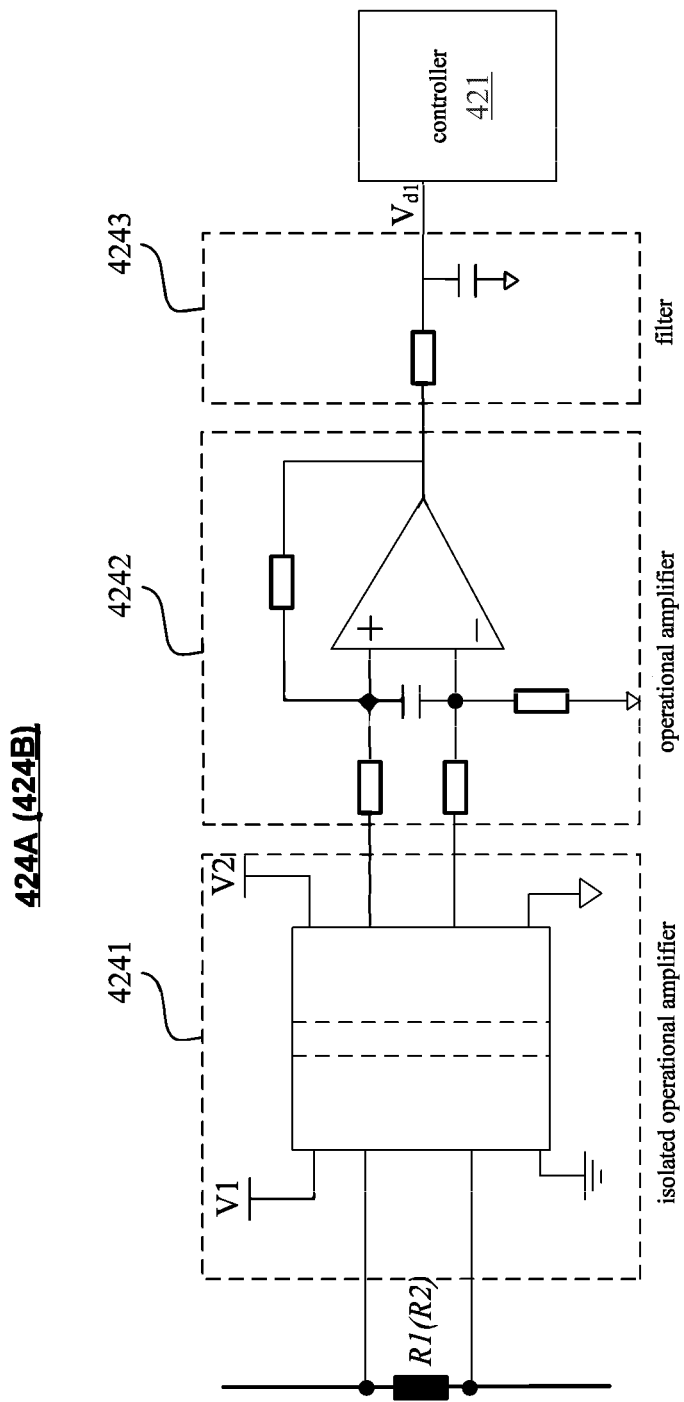
FIG. 9 shows a circuit diagram of sampling circuits according to techniques of the disclosure according to an embodiment.

FIG. 9 shows a circuit diagram of example sampling circuits 424A, 424B according to techniques of the disclosure. In the example sampling circuit 424A (424B), the sampling resistor R1 (R2) is sequentially coupled to the controller 421 via an isolated operational amplifier 4241, an operational amplifier 4242, and a filter 4243.

In order to minimize the power loss due to the sampling resistor R1 (R2), the resistance value of the sampling resistor R1 (R2) is very small. As a result, the voltages across the sampling resistors R1 and R2 are also small when a secondary side current flows through the sampling resistors R1 and R2, and it is not possible to decide directly based on the voltages across the sampling resistors R1 and R2. To this end, the isolated operational amplifier 4241 scales up the voltage signal across the sampling resistor R1 (R2) and inputs it to the operational amplifier 4242, and, at the same time, isolates the circuits of the input from the output, so that the power in the main circuit does not affect the sampling circuit 424A (424B), and the EMI effect of the high power in the main circuit on the sampling circuits can be avoided.

Operational amplifier 4242 converts the input differential sample signals into a single-ended sampling signal and varies the input to output proportional signals by changing the resistance ratio.

Filter 4243 filters high frequency noises from the input signal and provides the output signal to controller 421. As a result, the controller 421 is able to obtain sampling voltages Vd1, Vd2 that are proportional to the voltages across the sampling resistors R1, R2.

Referring back to FIG. 8(A), when the DC-DC converter 42A is operated in a first mode for power conversion from the primary side to the secondary side, the controller 421 provides control instructions to the secondary-side driver 423 based on the sampled voltages Vd1, Vd2 of the sampling resistors R1, R2, thereby performing a switching control for the power switching devices S5-S8.

Figure 10:
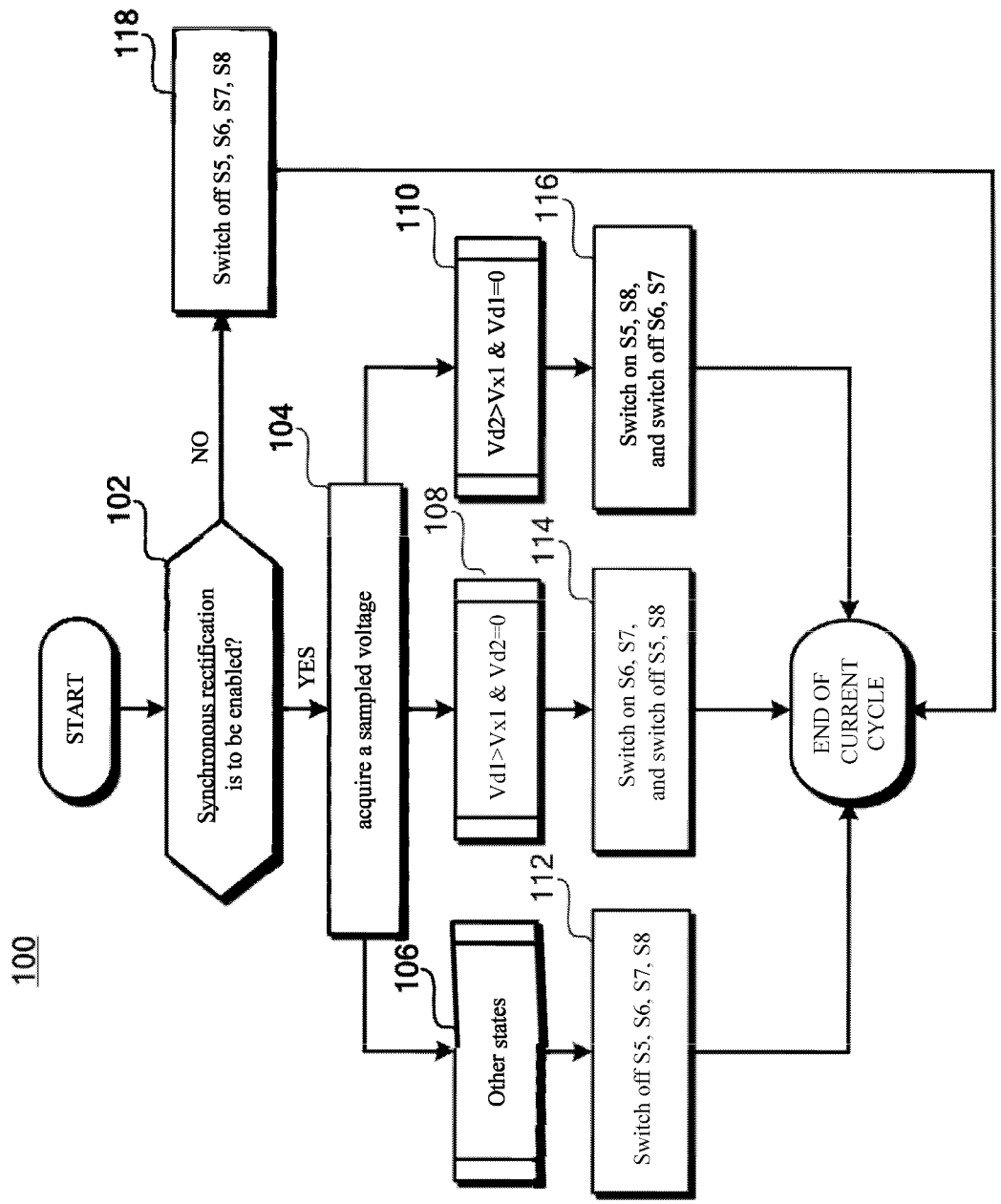
FIG. 10 shows a flowchart of an example control method performed by a controller according to an embodiment.

FIG. 10 shows a flowchart of an example control method 100 performed by a controller 421 according to the techniques of the disclosure. In method 100, the controller 421 first determines, in block 102, whether to enable a synchronous rectification. Synchronous rectification for power switching devices S5-S8 can be enabled depending on the state of circuit operation, load state, etc. If it is determined in block 102 that synchronous rectification is not to be enabled ("NO" in block 102), the method 100 proceeds to block 118 to switch off the power switching devices S5-S8. If it is determined in block 102 that synchronous rectification is to be enabled ("YES" in block 102), the method 100 proceeds to block 104 to acquire sampled voltages Vd1, Vd2 of the sampling resistors R1, R2, which are obtained by scaling-up voltages across the sampling resistors R1, R2.

When the sampled voltage of one of the sampling resistors R1, R2, e.g., the sampled voltage Vd1 of sampling resistor R1, increases and exceeds the threshold Vx1 (a first threshold) and the other (amplified) sampled voltage Vd2 of the other sampling resistor R2 is near zero, the method 100 proceeds to block 104 to perform a complementary switching control for the power switching devices S5-S8, so that the power switching devices S6, S7 are switched on and the power switching devices S5, S8 are switched off. The threshold Vx1 may be 5% of the maximum value of sampled voltage Vd1 for example. In contrast, when the sampled voltage of the sampling resistors R2 increases and exceeds a threshold Vx1 and the sampled voltage of the sampling resistor R1 is near zero, the method 100 proceeds to block 110 to perform a complementary switching control for the power switching devices S5-S8, so that the power switching devices S5, S8 are switched on and the power switching devices S6, S7 are switched off. In other states, such as when sampled voltages of the sampling resistors R1, R2 are both near zero, the method 100 proceeds to block 112, in which the controller 421 provides control instructions to the secondary-side driver 423 to switch off all the power switching devices S5-S8. In this case, synchronous rectification is not enabled, and the secondary circuit is equivalent to a diode rectifier bridge. Upon completion of controls in blocks 112, 114, 116, the current cycle ends. The controller 421 may repeat the control method 100 shown in FIG. 10 at the beginning of a next cycle.

To sum up, the controller 421 is able to determine, based on voltages of the sampling resistors R1, R2, the on/off timing of the power switching devices S5-S8 required for implementing synchronous rectification. Compared to synchronous rectification control based on voltage detection for the power switching devices shown in FIG. 7(A), it is possible to determine not only the on-time of the power switching devices S5-S8 based on voltages of the sampling resistors R1, R2, but also the off-time of the power switching devices S5-S8. Compared to the scheme based on voltage detection where only the on-time but not the off-time can be determined shown in FIG. 7(A), the embodiment effectively avoids the stability problem caused by simultaneous conduction of bridge arms on the same side. In addition, the embodiment does not require an auxiliary transformer Taux as in the synchronous rectification control based on secondary side current detection shown in FIG. 7(B), and thus has the advantage of low cost and miniaturization.

In addition, an implementation of setting the sampling resistors R1, R2 on the secondary side is described in this embodiment. However, primary-side sampling resistors (also referred to herein as second sampling resistors) can also be set in the same way. In other words, sampling resistors may be provided on each of the upper bridge arms or lower bridge arms of the primary-side rectifier bridge. The controller 421 may perform switching control for the power switching devices S1-S4 based on sampled voltages of the primary-side sampling resistors in a second mode for power conversion from the secondary side to the primary side, to achieve synchronous rectification in the second mode. The control for power switching devices S1-S4 in the second mode is similar to the control for power switching devices S5-S8 in the first mode and will not be repeated here.

While it is described above that the techniques of the disclosure are implemented in a CLLC resonant circuit, it should be understood that the techniques of the disclosure are applicable to bi-directional DC-DC converter circuits having rectifier bridges, consisting of power switching devices, on both the primary and secondary sides, and are not limited to CLLC resonant circuits. The power switching devices on the secondary side can used both as a secondary side switching control in the second mode for power conversion from the secondary side to the primary side (which in this case corresponds to the primary side switching control in the first mode), and for implementing synchronous rectification on the secondary side in the first mode for power conversion from the primary side to the secondary side. Also, according to the techniques disclosed herein, synchronous rectification can be achieved accurately regardless of the switching frequency at which the conversion circuit operates, and further advantages such as low cost and miniaturization can be obtained.

Program code may be applied to input instructions to carry out the functions described herein and generate output information. The output information may be applied to one or more output device in a known manner. For purposes of the application, a processing system includes any system having a processor such as, for example, a digital signal processor (DSP), a microcontroller, an application-specific integrated circuit (ASIC), or a microprocessor. Program code may be implemented in a high-level procedural programming language or an object-oriented programming language to communicate with the processing system.

One or more aspects of at least one embodiment may be realized by representational instructions stored on a machine-readable medium representing various logics in a processor that, when read by a machine, causes the machine to make the logic used to perform the techniques described herein.

Preferred embodiments of the invention are described above in the detailed description. Nevertheless, it is to be understood that various embodiments and variations may be employed without departing from the wide spirit and range of the present invention. In accordance with the concept of the invention, numerous modifications and variations can be made by those of ordinary skill in the art without creative labor. Therefore, any technical solution that can be obtained by logical analysis, reasoning, or limited experimentation by those skilled in the art on the basis of the prior art in accordance with the concept of the invention shall fall within the scope of protection determined from the claims of the invention.

In some aspects, the techniques described herein relate to an isolated bi-directional DC conversion circuit, including: a transformer with at least one first energy storage element; a primary-side rectification bridge coupled to a primary side of the transformer and with at least one second energy storage element; a secondary-side rectification bridge coupled to a secondary side of the transformer, wherein the primary-side rectification bridge consists of multiple first power switching devices, wherein the secondary-side rectification bridge consists of multiple second power switching devices, and wherein each of the multiple first power switching devices and the second power switching devices having a body diode in inverse parallel connection therewith; multiple first sampling resistors respectively provided on each bridge arm of an upper bridge arm or a lower bridge arm of the secondary-side rectification bridge; and a controller configured to, in a first mode for power conversion from the primary side to the secondary side, perform switch control on the multiple second power switching devices based on a sampled voltage of the multiple first sampling resistors.

In some aspects, the techniques described herein relate to an isolated bi-directional DC conversion circuit, wherein the sampled voltage is obtained by up scaling a voltage over the first sampling resistor.

In some aspects, the techniques described herein relate to an isolated bi-directional DC conversion circuit, wherein the controller is further configured to, in the first mode, in response to determining that the sampled voltage of one first sampling resistor among the multiple first sampling resistors exceeds a first threshold, perform a complementary switch control on the multiple second power switching devices so that the second power switching device corresponding to the bridge arm where the one first sampling resistor is located is switched on.

In some aspects, the techniques described herein relate to an isolated bi-directional DC conversion circuit, wherein the controller is further configured to, in the first mode, switch off the multiple second power switching devices in response to determining that the sampled voltage of each of the multiple first sampling resistors is near zero.

In some aspects, the techniques described herein relate to an isolated bi-directional DC conversion circuit, further including multiple second sampling resistors, wherein the multiple second sampling resistors are respectively provided on each bridge arm of an upper bridge arm or a lower bridge arm of the primary-side rectification bridge, the controller is further configured to, in a second mode for power conversion from the secondary side to the primary side, perform switch control on the multiple first power switching devices based on a sampled voltage of the multiple second sampling resistors.

In some aspects, the techniques described herein relate to an isolated bi-directional DC conversion circuit, wherein the controller is further configured to, in the second mode, in response to determining that the sampled voltage of one second sampling resistor among the multiple second sampling resistors exceeds a second threshold, perform a complementary switch control on the multiple first power switching devices so that the first power switch corresponding to the bridge arm where the one second sampling resistor is located is switched on.

In some aspects, the techniques described herein relate to an isolated bi-directional DC conversion circuit, wherein the controller is further configured to, in the second mode, switch off the multiple first power switching devices in response to determining that the sampled voltage of each of the multiple second sampling resistors is near zero.

In some aspects, the techniques described herein relate to an isolated bi-directional DC conversion circuit, wherein the isolated bi-directional DC conversion circuit is a bi-directional LLC resonant circuit, wherein the primary-side rectification bridge and the secondary-side rectification bridge each constitutes an H-bridge and wherein the multiple first sampling resistors includes two first sampling resistors respectively provided on two upper bridge arms or lower bridge arms of the secondary-side rectification bridge.

In some aspects, the techniques described herein relate to an on-board charger system, including: a bi-directional PFC circuit; and the isolated bi-directional DC conversion circuit coupled to the bi-directional PFC circuit.

In some aspects, the techniques described herein relate to a method for controlling an isolated bi-directional DC conversion circuit, the method including: acquiring a sampled voltage of multiple first sampling resistors provided on an upper bridge arm or a lower bridge arm of a secondary-side rectification bridge of the isolated bi-directional DC conversion circuit; and in a first mode for power conversion from a primary side to a secondary side, performing switch control on multiple second power switching devices based on a sampled voltage of the multiple first sampling resistors.

The invention claimed is:

1. An isolated bi-directional DC conversion circuit, comprising:
   a transformer with at least one first energy storage element;
   a primary-side rectification bridge coupled to a primary side of the transformer and with at least one second energy storage element;
   a secondary-side rectification bridge coupled to a secondary side of the transformer, wherein the primary-side rectification bridge consists of multiple first power switching devices, wherein the secondary-side rectification bridge consists of multiple second power switching devices, and wherein each of the multiple first power switching devices and the second power switching devices having a body diode in inverse parallel connection therewith;
   multiple first sampling resistors respectively provided on each bridge arm of an upper bridge arm or a lower bridge arm of the secondary-side rectification bridge; and
   a controller configured to, in a first mode for power conversion from the primary side to the secondary side, perform switch control on the multiple second power switching devices based on a sampled voltage of the multiple first sampling resistors.

2. The isolated bi-directional DC conversion circuit of claim 1, wherein the sampled voltage is obtained by up scaling a voltage over the first sampling resistor.

3. The isolated bi-directional DC conversion circuit of claim 1, wherein the controller is further configured to, in the first mode, in response to determining that the sampled voltage of one first sampling resistor among the multiple first sampling resistors exceeds a first threshold, perform a complementary switch control on the multiple second power switching devices so that the second power switching device corresponding to the bridge arm where the one first sampling resistor is located is switched on.

4. The isolated bi-directional DC conversion circuit of claim 3, wherein the controller is further configured to, in the first mode, switch off the multiple second power switching devices in response to determining that the sampled voltage of each of the multiple first sampling resistors is near zero.

5. The isolated bi-directional DC conversion circuit of claim 1, further comprising multiple second sampling resistors, wherein the multiple second sampling resistors are respectively provided on each bridge arm of an upper bridge arm or a lower bridge arm of the primary-side rectification bridge, the controller is further configured to, in a second mode for power conversion from the secondary side to the primary side, perform switch control on the multiple first power switching devices based on a sampled voltage of the multiple second sampling resistors.

6. The isolated bi-directional DC conversion circuit of claim 5, wherein the controller is further configured to, in the second mode, in response to determining that the sampled voltage of one second sampling resistor among the multiple second sampling resistors exceeds a second threshold, perform a complementary switch control on the multiple first power switching devices so that the first power switch corresponding to the bridge arm where the one second sampling resistor is located is switched on.

7. The isolated bi-directional DC conversion circuit of claim 6, wherein the controller is further configured to, in the second mode, switch off the multiple first power switching devices in response to determining that the sampled voltage of each of the multiple second sampling resistors is near zero.

8. The isolated bi-directional DC conversion circuit of claim 1, wherein the isolated bi-directional DC conversion circuit is a bi-directional LLC resonant circuit, wherein the primary-side rectification bridge and the secondary-side rectification bridge each constitutes an H-bridge and wherein the multiple first sampling resistors comprises two first sampling resistors respectively provided on two upper bridge arms or lower bridge arms of the secondary-side rectification bridge.

9. An on-board charger system, comprising:
   a bi-directional PFC circuit; and
   the isolated bi-directional DC conversion circuit of claim 1 coupled to the bi-directional PFC circuit.

10. A method for controlling an isolated bi-directional DC conversion circuit, the method comprising:
    acquiring a sampled voltage of multiple first sampling resistors provided on an upper bridge arm or a lower bridge arm of a secondary-side rectification bridge of the isolated bi-directional DC conversion circuit; and
    in a first mode for power conversion from a primary side to a secondary side, performing switch control on multiple second power switching devices based on a sampled voltage of the multiple first sampling resistors.

* * * * *